United States Patent [19]
Harvey

[11] 3,906,516
[45] Sept. 16, 1975

[54] METHOD AND APPARATUS FOR CONTROLLING EXPOSURE IN ARTIFICIAL ILLUMINATION
[75] Inventor: Donald M. Harvey, Webster, N.Y.
[73] Assignee: Eastman Kodak Company, Rochester, N.Y.
[22] Filed: Nov. 25, 1974
[21] Appl. No.: 526,490

[52] U.S. Cl. ............ 354/27; 354/31; 354/149
[51] Int. Cl.² .................. G03B 7/08; G03B 15/03
[58] Field of Search .......... 354/26, 27, 29, 30, 31, 354/32, 36, 38, 40, 43, 48, 49, 50, 51, 60, 126, 139, 149; 250/214

[56] References Cited
UNITED STATES PATENTS

| | | | |
|---|---|---|---|
| 3,091,166 | 5/1963 | Norwood | 354/31 |
| 3,105,428 | 10/1963 | La Rue, Jr. | 354/42 |
| 3,438,313 | 4/1969 | Topaz | 354/35 |
| 3,464,332 | 9/1969 | Davison et al. | 354/27 |
| 3,486,821 | 12/1969 | Westhaven | 354/60 EI X |
| 3,641,891 | 2/1972 | Burgarella | 354/30 X |
| 3,662,659 | 5/1972 | Metzger et al. | 354/29 |
| 3,714,871 | 2/1973 | Bresson | 354/44 X |
| 3,731,604 | 5/1973 | Fujii et al. | 354/31 |
| 3,871,005 | 3/1975 | Uchida et al. | 354/31 X |
| R28,025 | 5/1974 | Murata et al. | 250/214 X |

Primary Examiner—Joseph F. Peters, Jr.
Attorney, Agent, or Firm—D. P. Monteith

[57] ABSTRACT

A method and apparatus for controlling exposure in flash photography includes a first photocell positioned to receive light reflected from a scene that is illuminated by flash light and available ambient light and a second photocell positioned to receive only direct flash light. Once a flash lamp is energized, the effective lens aperture is progressively reduced in size until the instantaneous ratio of the output signal from the first photocell to the output signal of the second photocell falls below a predetermined value at which time the lens aperture is set and shutter opening movement is initiated. In one embodiment the shutter is closed at the end of a fixed time period. In a second preferred embodiment a light responsive integrating circuit is utilized to control shutter speed in accordance with the scene light impinging on the camera film exposure plane. With each of these embodiments, a maximum depth of field is achieved which takes into account ambient light and reflected flash light.

17 Claims, 8 Drawing Figures 3,906,516

METHOD AND APPARATUS FOR CONTROLLING EXPOSURE IN ARTIFICIAL ILLUMINATION

BACKGROUND OF THE INVENTION

1. Field of the Invention

This invention relates to automatic exposure control for both flash and natural light photography and, more particularly, to a method and apparatus for controlling exposure in such a manner that the smallest effective lens aperture which will properly expose film is automatically chosen for flash photography.

2. Description of the Prior Art

It is known in the art to automatically adjust exposure during flash photography in accordance with the amount of illumination impinging on a photoconductive device in an exposure control circuit. For example, U.S. Pat. No. 3,486,821 issued to Westhaver on Dec. 30, 1969, and entitled System for Integrating Light Energy discloses a light-sensitive integrated circuit comprising a FOTOFET coupled to a timing capacitor. This circuit regulates shutter speed in accordance with the actual amount of flash light reflected from the scene being photographed.

U.S. Pat. No. 3,464,332 issued to Davidson et al. on Sept. 2, 1969, and entitled Automatic Exposure Control System discloses a flash light aperture control mechanism in which effective lens aperture size is varied in accordance with the distance the scene being photographed is from the camera.

It is also known in the art to control the effective lens aperture in flash photography by measuring the amount of illumination incident at the photographic scene as well as the amount of light reflected from the scene toward the camera location. This is done to compensate for scene reflectance characteristics which may deviate from a nominal photographic scene and which would produce an improper flash exposure value if only incident light but not the reflected light is measured or vice versa. U.S. Pat. No. 3,091,166 issued to D. W. Norwood on May 28, 1968, and entitled Photographic Device Responsive to Both Incident and Reflected Light discloses light-responsive apparatus for automatically adjusting a lens aperture. Such apparatus comprises one photoresistor responsive to incident light and a second photoresistor responsive to reflected flash light. The two photoresistors are interconnected in series to form a composite aperture control signal related to the sum of their individual resistances.

U.S. Pat. No. Re. 28,025 issued to Murata et al. May 28, 1974, and entitled Automatic Control Device for Electronic Flash discloses a flash quenching circuit comprising two photoelectric elements, one for measuring daylight or natural light and the other for measuring light from the electronic flash. The signals produced by the two elements are added for regulating the quantity of light from the electronic flash.

The aforementioned reference disclose apparatus, for use in flash photography, that controls either shutter speed (or effective shutter speed) as a function of reflected flash light, or aperture size as a function of anticipated flash light. Such references all suffer from the disadvantage in that only one exposure parameter is automatically controlled as a function of flash light intensity. Consequently, for flash exposures, the prior art has not been able to provide a satisfactory compromise between lens aperture size, which determines depth of field, and shutter speed, which for a proper exposure value is functionally related to aperture size.

There are some commercially available cameras that include apparatus that operates to adjust the effective lens aperture in accordance with measured ambient illumination and the anticipated flash illumination. Such apparatus utilizes a light-sensitive circuit for determining the light level of ambient illumination and functions as follows: When a flash lamp is on the camera, the light-sensitive circuit operates to set the aperture at a value related to the ambient light. However, due to the presence of the flash lamp, an interlock is actuated that prevents the aperture from being set larger than a predetermined value. This results even though a larger aperture size may be dictated by the light-sensitive circuit. Consequently, the aperture is deliberately set for an underexposure, if only ambient light is utilized. It has been generally found that the flash illumination supplements the available ambient light to produce an acceptable exposure value. However, this approach to flash photography is dependent on how accurately the camera is focused when the aperture is set and has sometimes been found to be ineffective for cameras of the type which are fixed focus or have a two-zone focus.

With some films, exposure errors that result can be compensated by using film processing technics well known to those skilled in the art. However, there are other films with which these processing technics are ineffective and, consequently, exposure error cannot be reduced. Furthermore, as films are produced having higher ASA ratings the amount of exposure error that can be tolerated diminishes and it becomes more essential for more accurately controlling exposure.

SUMMARY OF THE INVENTION

One of the objects of the present invention is to provide an improved method and apparatus for regulating exposure during flash photography.

Another object of the invention is to automatically select the smallest aperture for either flash or natural light photography that will properly expose film during a particular interval of time.

A still further object of the invention is to provide an improved method and exposure control apparatus of the aforementioned type that eliminates the need for the camera operator to make a focus adjustment when taking flash pictures.

A yet another object of the present invention is to provide an improved method for controlling flash exposures that automatically takes into account ambient illumination as well as flash illumination during a flash picture-taking sequence.

Another object of the instant invention is to provide an improved method and apparatus of the aforementioned type that operates to regulate aperture size as well as shutter speed during a flash exposure.

Another object of the present invention is to provide an improved method and apparatus for controlling a flash exposure in which the aperture size and shutter speed are controlled sequentially and in which both aperture size and shutter speed are controlled in accordance with the ambient as well as the flash illumination intensities.

In accordance with the aforementioned objects there is provided a method of photographing a scene utilizing artificial illumination, which method comprises the steps of attenuating, concurrent with the existence of such illumination, light reflected from the scene being photographed by progressively reducing the effective aperture through which such scene light is projected from a relatively large size towards a relatively small size, establishing a particular exposure aperture effective for producing a given film exposure value during a final portion of such artificial illumination, and subsequently thereto exposing photographic film to reflected scene light to produce said given exposure value.

The apparatus practicing the method summarized immediately hereinbefore comprises shutter means for regulating the passage of light through an exposure aperture, diaphragm means movable along a path between (1) an initial, relatively large aperture defining position and (2) a final, relatively small aperture defining position for producing a time dependent progressive variation of effective exposure apertures as a function of the position of the diaphragm means along such path, means for effecting such progressive variation of effective exposure apertures in timed relation to energization of a received flash device, an electronic circuit having (1) first photoconductive means located to receive an amount of light proportionate to the scene illumination projected through such variable exposure apertures and (2) second photoconductive means located to receive direct flash illumination from the received flash device, the first and second photoconductive means being interconnected to produce an exposure control signal having an amplitude related to the instantaneous ratio of the light received by the first photosensitive means to the flash light received by the second photoconductive means, and switching means for stopping the diaphragm means at a particular aperture defining position when the control signal is within a predetermined range, the switching means further including means for controlling the shutter means for a given time interval, subsequent to the diaphragm means being stopped, to produce a flash exposure.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Because photographic cameras are well known, the present description will be directed in particular to elements forming part of, or cooperating more directly with, apparatus in accordance with the present invention. It is to be understood camera elements not specifically shown or described may take various forms well known to those having skill in the art.

Figure 1A:
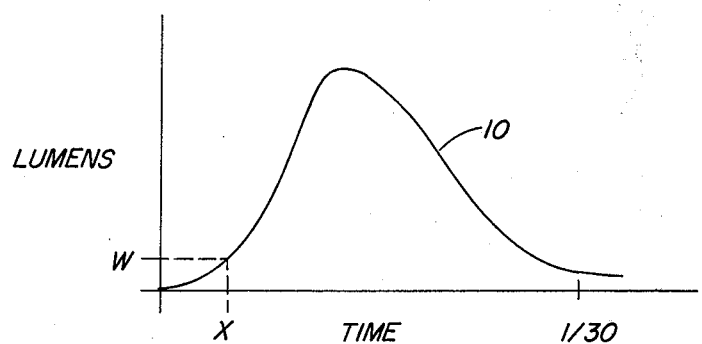
FIGS. 1A–1D are graphical illustrations with respect to time showing, respectively: (1) illumination from a photographic flash lamp; (2) relative effective aperture size when the lens aperture is progressively reduced beginning at a predetermined time, (X), shown in FIG. 1A (3) a family of curves representing the ratio of reflected scene illumination to direct flash light for various scene photographic conditions; and (4) the ratio of reflected scene illumination to flash light for the various photographic conditions considered in FIG. 1C when the reflected scene illumination is projected through a lens aperture that is varied as shown in FIG. 1B.

Referring to FIG. 1A, there is shown a curve 10 which illustrates, merely in a general manner, the light output of an expendable photographic flash device such as a flashbulb or flash lamp. Flash illumination varies from lamp to lamp, but typically this illumination has a duration on the order of 35–40 milliseconds (ms) and includes an initial portion having a sharp relatively rapid rise time on the order of 10 ms and following peak light level a gradually reduced light intensity level on the order of 20 ms or more. For a reason made known hereinafter, time X is determined at some predetermined flash light level W. At time X the exposure cycle of the exposure control apparatus of the present invention is initiated, which time, because of the aforementioned flash illumination characteristics, may vary from lamp to lamp.

Figure 1B:
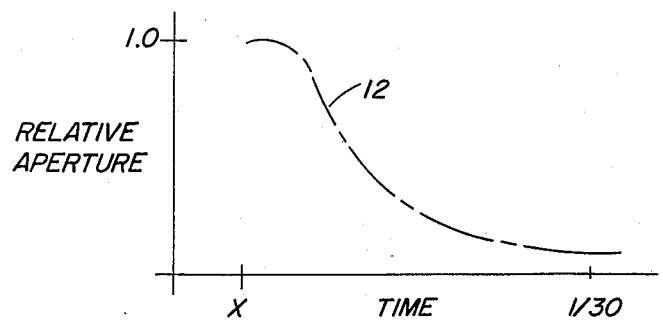

FIG. 1B includes a curve 12 which is an illustration of effective lens aperture size as a function of time, with the aperture fully opened at time X and progressively reduced in size, in the manner shown, for times beyond X.

Figure 1C:
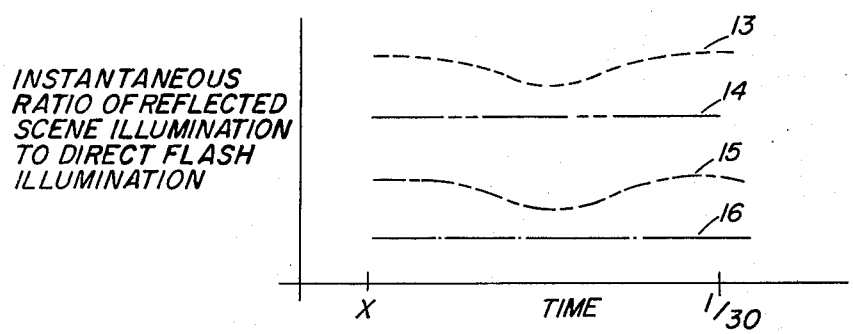

The curves 13, 14, 15 and 16 of FIG. 1C depict on a relative basis for various hypothetical scene light conditions the instantaneous ratio of (1) light reflected from a scene, which light consists of flash as well as ambient illumination to (2) direct flash illumination, the flash light having a characteristic as illustrated by curve 10. The terms "ambient" or "ambient illumination" as used herein include not only sunlight or natural illumination but also include artificial ambient illumination other than light from a photographic flash lamp or flashbulb such as, for example, light from illuminated incandescent and luminescent bulbs. Curves 13–16 are primarily dependent on subject reflectivity and distance, and ambient illumination, the curve 13 being representative of an object at close camera distance with a relatively high ambient light level, the curve 14 being representative of a near object under a low ambient light condition, the curve 15 being representative of a far subject in relatively high ambient light and curve 16 being representative of a far subject in low ambient light. These curves would shift upwards for subjects having a high coefficient of reflectivity, whereas the curves would be biased lower for subjects having low reflectivity. With a near subject, the amount of light reflected from the scene is significantly greater due to a larger component of flash light. Consequently, for a particular scene reflectance value, curves 13 and 14 have a greater magnitude than curves 15 and 16 which are for a far subject.

Figure 1D:
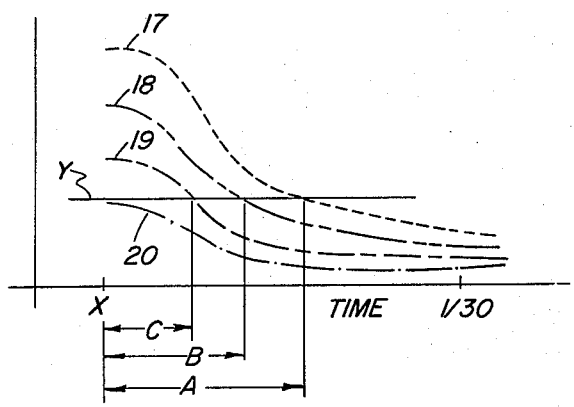

When light reflected from the scene is projected through a lens aperture having progressively varying size as illustrated by curve 12, such light is attenuated so that, for the scenes hypothesized, curves 13–16 become the curves 17–20, respectively, illustrated in FIG. 1D. Curves 17–19 intercept a predetermined level Y at points in time which are removed from time X inversely as the exposure time that would be necessary whereas curve 20 does not reach the level Y at any time.

If time X is known, it is then known approximately how much flash illumination remains and the approximate remaining flash duration. Furthermore, if the reflected scene light at X is known, the amount of ambient illumination can be determined and exposure parameters such as aperture size and shutter speed can be established accordingly. In accordance with the teachings of this invention, the lens aperture is reduced automatically during the early part of flash illumination to produce the smallest aperture that will produce a particular exposure value during a final portion of such illumination.

Consequently, level Y is selected such that it represents the value of the ratio between reflected scene light, when projected through an attenuated aperture, and direct flash light that results in a correct exposure of the subject utilizing flash illumination without further aperture attenuation. By choosing the appropriate value of Y which reflects the ASA rating of the film being subjected to scene light and geometrical factors of the camera, such as F/number, proper exposure of the scenes covered by the four curves can be closely approximated by setting the aperture to thereby prevent further aperture size reduction as soon as the ratio of reflected scene light to direct flash light is less than Y, then opening the shutter to expose the film. Thus, in curve 20 an exposure would commence immediately at time X with the aperture fully opened. In the cases of curves 17–19 time lags would result, equivalent to those indicated by the letters A, B and C, respectively, during which times the lens aperture is progressively reduced in size to produce the smallest aperture permitted under the existent light conditions, prior to the shutter being opened.

With this arrangement, a maximum depth of field is established. Most cameras having f/2.8 lenses with normal focal lengths can be operated satisfactorily using one focus position. The increased depth of field which accrues to smaller apertures more than compensates for the change in focus over the normal flash picture-taking range of 3.5 to 25 feet. As to how these results are achieved will become obvious to those skilled in the art upon reading the following disclosure in conjunction with the drawings.

Figure 2:
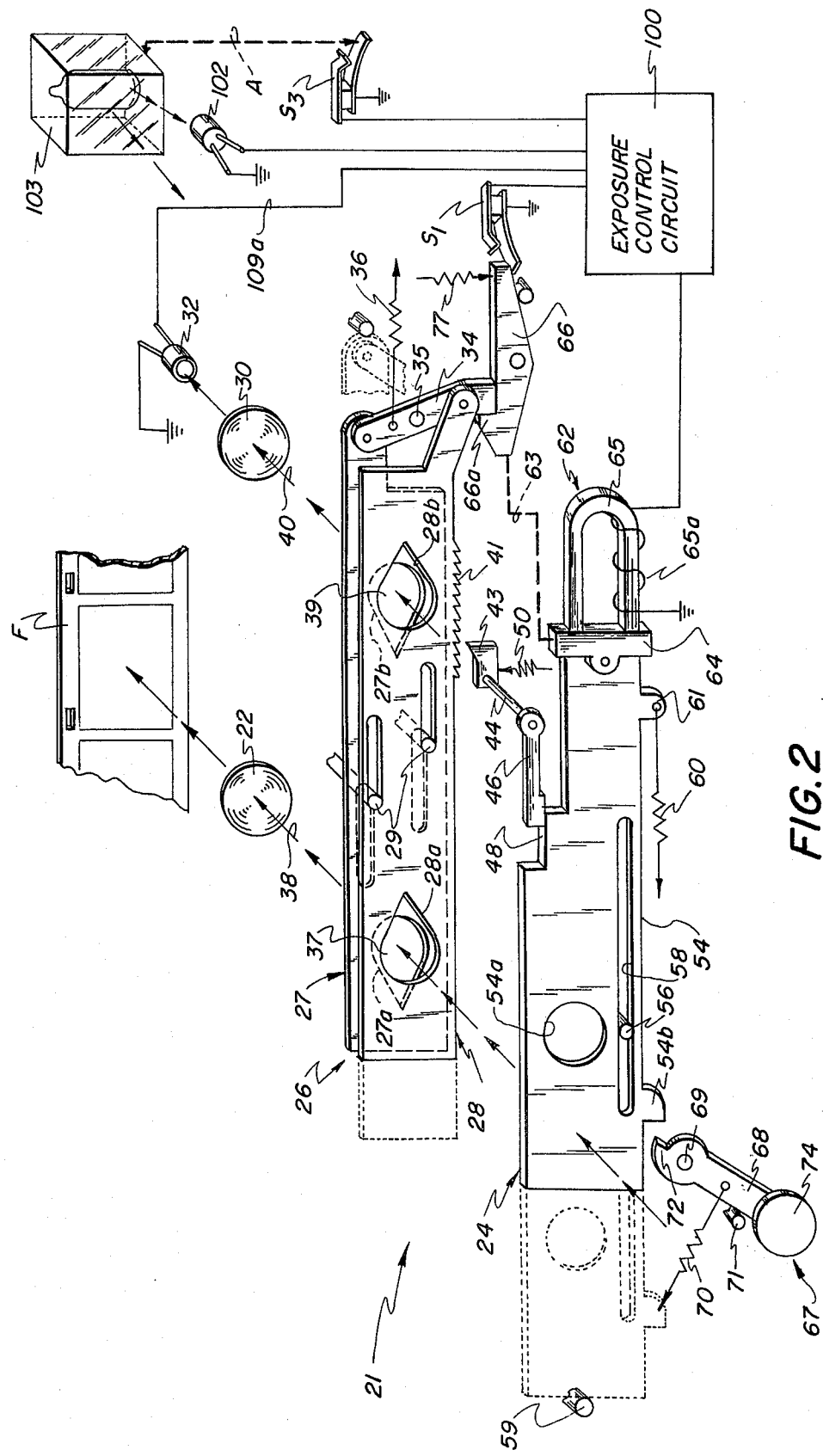
FIG. 2 is an exploded perspective view of a portion of a camera with film loaded therein including a shutter mechanism and a diaphragm mechanism adapted to cooperatively control film exposure.

Referring now to FIG. 2, there is shown schematically a camera 21 having an objective lens 22, a shutter mechanism 24 for controlling the time interval film F is exposed to light from a scene being photographed, and a diaphragm mechanism 26 for forming an adjustable, effective exposure aperture in alignment with lens 22.

Diaphragm mechanism 26 includes a pair of apertured blades 27, 28 mounted in front of objective lens 22 and an objective 30, as viewed in the drawing, objective 22 being arranged and located for directing scene light onto photographic film F and objective 30 being located for directing a proportionate amount of light onto a photoconductive device 32 such as a photocell or the like. Blades 27, 28 are mounted for opposed slidable movement relative to each other by means of a pair of pins 29 which are mounted on a camera support plate (not shown) and are loosely received in elongate slots cut or formed from each of the diaphragm blades. An interconnecting lever 34 is hinged to blades 27, 28 as shown and is mounted about a pivot 35 to impart movement to the diaphragm blades in opposition to each other under the influence of spring 36. Diaphragm blades 27, 28 are respectively provided with teardropped-shaped apertures 27a, 27b and 28a, 28b which respectively overlap each other to cooperatively form a variable lens exposure aperture 37 aligned with optical axis 38 and a variable photocell aperture 39 aligned with optical axis 40. Each of the blade apertures is aligned with its tapered end portion extending in a direction such that relative movement of blades 27, 38 under the influence of spring 36 progressively diminishes the size of exposure aperture 37 and photocell aperture 39 until each of such apertures are fully closed.

During aperture setting movement, serrations or notches 41 on blade 28 pass over a locking means or pawl 42 which is connected by an elongate pin 44 to a cam follower arm 46. Arm 46 rests on the shoulder of a cam surface 48 of shutter mechanism 24 and in so doing holds pawls 43 away from notches 41 against the influence of spring 50. However, movement of shutter mechanism 24 to commence a film exposure interval permits pawl 43 under the influence of spring 50 to engage a one of the notches 41 to thereby lock or latch blades 27, 28 which sets exposure aperture 37. Shutter opening movement is achieved automatically by means of a light-sensitive exposure control circuit 100 which is illustrated more completely in FIG. 3.

Shutter mechanism 24 includes an apertured shutter blade 54 mounted within the camera by means of pin 56 which is fixedly mounted by means not shown so as to be loosely received in slot 58. With this arrangement, shutter blade 54 may move transverse to axis 38 between an initial, cocked position shown by the solid lines in FIG. 2 and a final, released portion, shown by the partial dashed lines, adjacent stop member 59. Shutter 54 is biased by a spring 60 to move from its cocked position toward its released position, one end of the spring being hooked to projection 61 integrally connected to the shutter blade while the other end of the spring is fixedly secured by means not shown. Shutter blade 54 is releasably retained in its cocked position covering exposure aperture 37 against the bias of spring 60 by means of both an electromagnetic latch 62 and a retaining arm 63, which is shown symbolically in FIG. 2 by dashed lines. Latch 62 comprises an electromagnetic keeper 64 positioned adjacent the poles of an electromagnet 65 which is energized and deenergized by electronic circuit 100. Arm 63 is secured to a spring-biased lever 66 and when positioned as shown operates to retain shutter blade 54 in its initial position when electromagnet 65 is deenergized.

The rate at which shutter blade 54 moves across exposure aperture 36 is controlled mechanically by means of an escapement mechanism 67 which includes a spring-biased restraining arm 68 pivotally mounted about a pivot 69. Arm 68 is biased in the clockwise direction by means of spring 70 against a stop member 71. In its biased position, finger member 72 extends across the path of projection 54b so as to be engaged thereby during film exposure movement. Mounted on the opposite end of arm 68 is a restraining mass 74. The restraining force produced by spring 70 and mass 74 are selectively controlled so that exposure aperture 54a is caused to move across exposure aperture 37 in approximately 1/30 second. Note, this time corresponds to the approximate duration of the flash lamp illumination illustrated in FIG. 1.

Diaphragm blades 27, 28 may be actuated to effect movement from their maximum apertured position to a reduced apertured position upon manual depression of a release member (not shown) mounted in an external position on camera 21 so as to be available to a camera operator. Such a release member as is known in the art would be mechanically coupled to lever 66 which is arranged and located so as to pivot in the counterclockwise direction contrary to spring 77 when the release member is actuated. When this counterclockwise movement occurs, hook portion 66a is disengaged from lever 34 to permit blades 27, 28 to commence aperture closing movement under the influence of spring 36.

As is known to those having taken flash photographs, some amount of ambient light is generally present during a flash exposure. Seldom is a flash picture taken when there is a complete absence of ambient light. In fact, many times a flash is used merely as a "fill-in" to reduce the harsh effects of dark shadows. Consequently, in order to accurately expose film in flash photography, it is necessary to take into account ambient illumination.

Electrical circuit 100 functions to properly control flash as well as daylight exposures and includes using with photocell 32 a second photocell 102, photocell 102 being located to receive direct light from a photographic flash device such as flashcube 103 whereas photocell 32 is arranged and located to receive light reflected from the scene being photographed as described previously herein. It shall be understood that with such arrangements, photocell 102 receives but a portion of the flash light, the remaining portion being projected towards a scene being photographed, and the light impinging on photocell 32 consists of not only reflected flash illumination but reflected ambient illumination.

Circuit 100 further includes a switching circuit denoted generally 104 which is connected to photocell 102. Circuit 104 is the type switching circuit having a normally conducting input stage and an output stage which is normally non-conducting, the circuit being adapted to switch its input OFF and its output ON once its input signal, that is, the signal produced by photocell 102, exceeds the aforementioned predetermined level W.

The output of switching circuit 104 is connected to the gate electrode of a silicon controlled rectifier (SCR) 106. As is known in the electronics art, an SCR is an electronic switching device which is normally non-conducting but which is rendered conductive when a pulse of current is caused to flow into its gate electrode and which remains conductive even after gate electrode current ceases as long as the magnitude of the current signal that flows from anode to cathode is above a predetermined level. With SCR 106 and switching circuit 104 interconnected as shown in combination with photocell 102, an electrical signal is produced at the SCR cathode linearly related to the photocell signal once the latter signal exceeds the level W. It should be pointed out that it may be necessary to include an amplifier (not shown) between terminal 108 and the SCR anode to provide adequate current to maintain the SCR ON once the output of circuit 104 is turned OFF due to the photocell signal falling below level W.

A circuit denoted generally 109 constitutes means for producing a control signal equal to the instantaneous ratio of the output signal from photocell 32 to the signal from photocell 102. As is shown, circuit 109 includes dual inputs 109a, 109b, input 109a providing one of two inputs to a multiplier circuit 110 which is connected in a feedback configuration with respect to an operational amplifier 112. Multiplier 110, amplifier 112 and input 109b are interconnected with respect to SCR 106 as shown to produce the aforementioned control signal at output 113. Circuits of the type that operate to produce an instantaneous ratio of one electrical signal to another electrical signal are known in the art and are shown and described in several references, one of which is entitled "Operation Amplifiers Design And Applications" and which discloses on page 279 thereof such a circuit. This reference is authored by Tobey et al. and published by McGraw-Hill Book Company.

The output of circuit 109 is connected to the input of a switching circuit 116 which is functionally similar to the aforementioned trigger circuit 104 but differs therefrom in that the input stage of circuit 116 is ON and the output thereof is OFF when its input signal is below the aforementioned level Y which may, of course, as is understood by those having skill in the art, be of a different value than the threshold switching level of circuit 104. The output of switching circuit 116 is connected in series to coil 65a and operates to energize and deenergize electromagnet 65 to control shutter blade 54.

To expose film F, the shutter release member is actuated whereby lever 66 is rotated in the counterclockwise direction. When this counterclockwise movement occurs, retaining arm 63 is disengaged from shutter blade 54. Immediately therebefore, lever 66 closes normally opened switch S1 to energize circuit 100. When this happens, flash device 103 and electromagnet 65 are energized, the latter operating to temporarily retain shutter blade 54 in its cocked position through keeper 64. It shall be understood that within the scope of the invention, the flash lamp may be energized electrically by applying an electrical signal to the lamp or mechanically by means not shown, but operatively associated with lever 66, for percussively firing the lamp. After the flash is energized, hook portion 66a is disengaged from lever 34 and diaphragm mechanism 26 is released for aperture closing movement under the influence of spring 36.

Lever 66 is configured so as to cause the flash to fire in timed relation with initial diaphragm setting movement. More specifically, lever 66 is configured to release lever 34 for aperture setting or closing movement at or as close to the same time that the magnitude of the electrical output signal produced by photocell 102 is equal to level W. It shall be understood by those skilled in the art that this result could be achieved electrically such as by utilizing an electronic switching circuit (not shown) that interconnects the cathode of SCR 106 to a latching device (also not shown) such as an electromagnet that latches lever 34. With this electrical arrangement, when SCR 106 is turned ON, that is, the photocell signal equals level W, the aforementioned switching circuit would switch so as to deenergize the latching device to thereby release lever 34 for commencing diaphragm blade movement. With this arrangement or the arrangement shown in FIG. 2, circuit 109 commences to produce an output control signal equal to the instantaneous ratio of the signal produced by photocell 32, which signal is applied to input 109a, and the signal produced by photocell 102, which signal is applied to input 109b, as blades 27, 28 commence aperture closing movement. The magnitude of the signals produced by both photocells should closely follow or track the magnitude of the light impinging respectively thereon. Due to the flash illumination, both light signals are transient and for accurate tracking to occur, it is necessary that these photocells be comprised of a light-sensitive material that responds rapidly to changing light levels. For this reason, the photocells should be made of material such as silicon, selenium or the like.

When the amplitude of the control signal produced by circuit 109 falls or is below level Y, the input of switching circuit 116 is rendered conductive and its output non-conductive. When this happens, electromagnet 65 is deenergized and shutter blade 54 is thereby released for shutter closing movement under the influence of spring 60. As this movement occurs, shoulder 48 moves beneath control arm 46. Due to the influence of spring 50, pawl 43 is rotated in the counterclockwise direction to latch diaphragm blade 28 in a particular aperture regulating position, the magnitude of which is functionally related to the time interval between time X and the time at which the control signal reaches or drops below Y, as illustrated in FIG. 1D.

Due to the fixed shutter speed, the film exposure interval is terminated a predetermined time after the aperture is set. Thus, if scene conditions were such as to produce a control signal similar to curve 20, an exposure would commence immediately at time X with the aperture fully opened and would terminate 1/30 second thereafter. In the cases of curves 17–19 the actual exposure interval would terminate 1/30 second following, respectively, each of the time lags A, B and C. In the absence of unusually high ambient light the effective exposure interval can be considered for curves 17–19 as being effectively terminated 1/30 second after the flash lamp is energized since by that time the flash light has been reduced to a relatively insignificant level as illustrated in curve 10.

In accordance with the teachings of this invention, there has been described in detail a method and apparatus for effecting exposure control during flash photography which adjusts lens aperture size to achieve maximum depth of field in accordance with existent scene light conditions.

Figure 3:
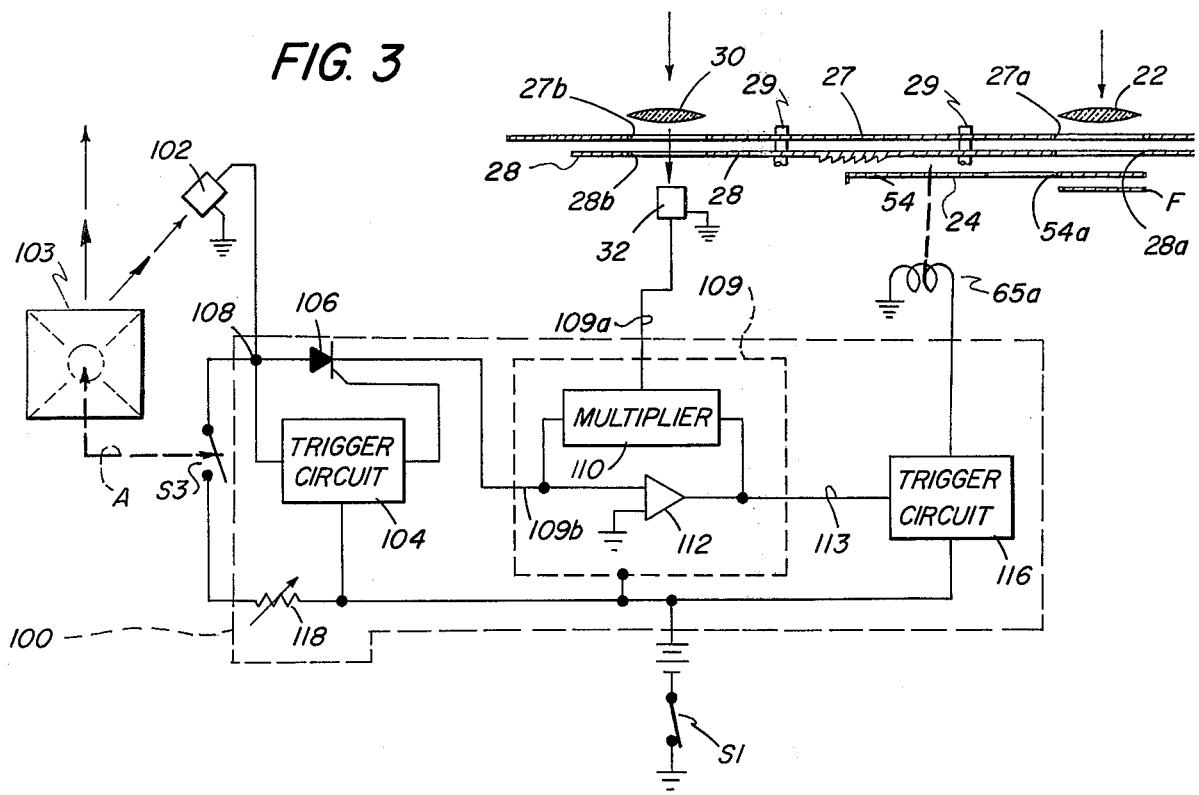
FIG. 3 shows an electrical circuit diagram in block form which in accordance with the teachings of this invention operates to control the exposure control mechanism shown in FIG. 2.
Figure 5:
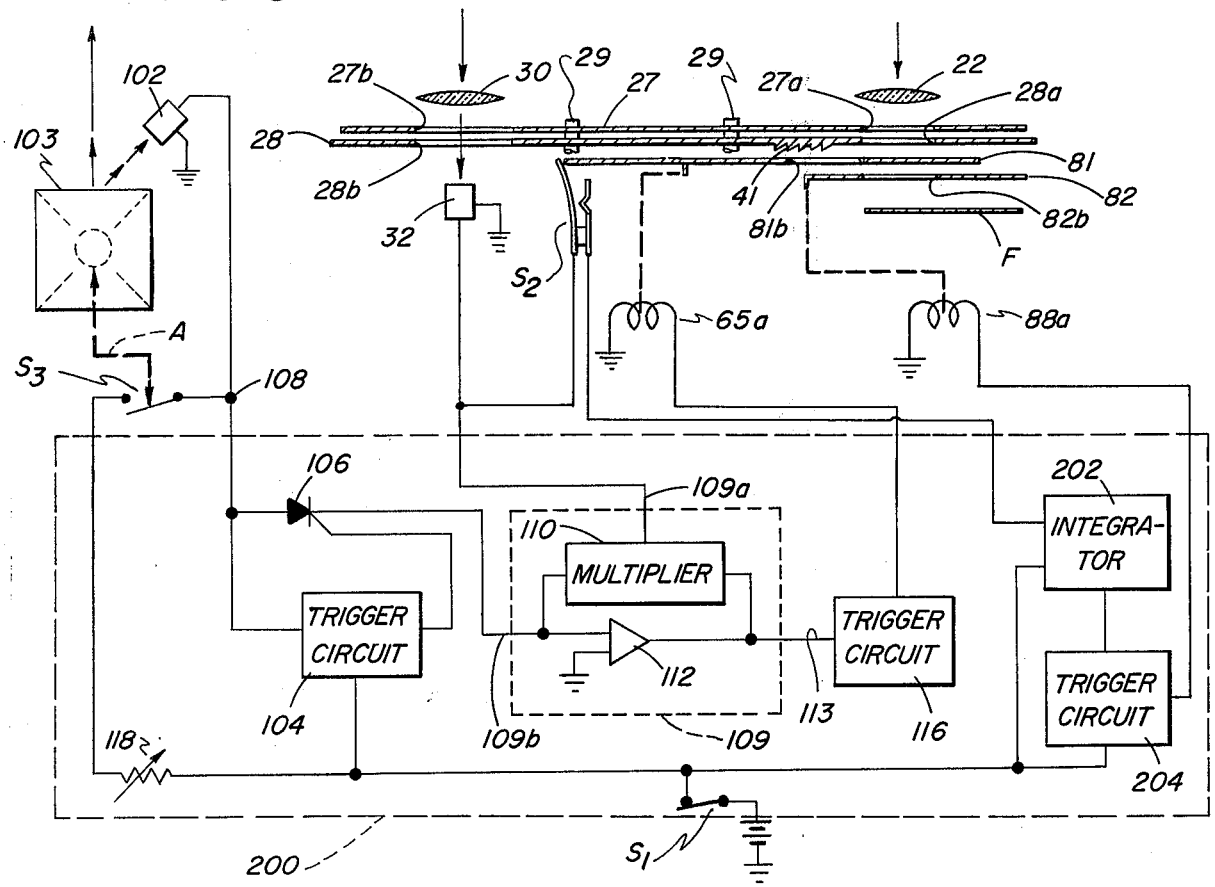
FIG. 5 shows an electronic circuit diagram in block form for controlling the shutter and diaphragm mechanism shown in FIG. 4.
Figure 4:
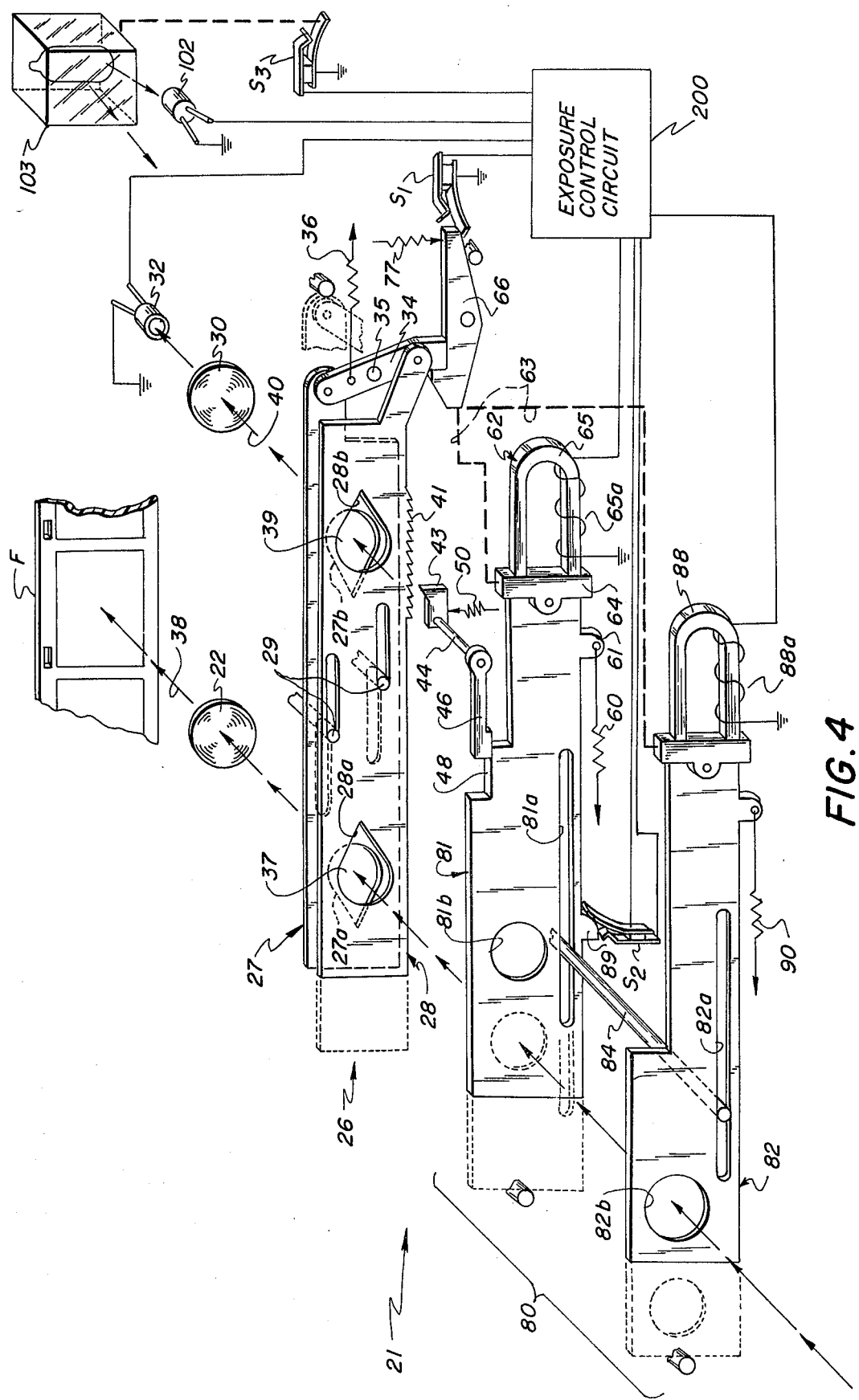
FIG. 4 is an exploded perspective view of a shutter mechanism and a diaphragm mechanism according to an alternative preferred embodiment of the invention.

Referring now to FIGS. 4 and 5, another preferred embodiment of the invention is shown where elements common to elements shown in FIGS. 2 and 3 have been identified with the same numerals. In general, the embodiment shown in FIGS. 4 and 5 differs from that of the embodiment shown in FIGS. 2 and 3 in that shutter closing movement is controlled electrically by a conventional integrating electronic exposure control circuit rather than mechanically with an escapement mechanism as described previously herein.

A shutter mechanism 80 used in the alternate embodiment of the invention is comprised of two apertured blades 81, 82. Blades 81, 82 have slots 81a, 82a, respectively, for receiving a common mounting pin 84 which is connected to a camera support plate (not shown), each blade being mounted on the pin for movement transverse to axis 38 between an initial or cocked position shown in FIG. 4 and a final released terminal position shown by the dashed lines in FIG. 4. Blades 81, 82 by virtue of apertures 81b, 82b, respectively, permit scene light, when in one position to impinge on film F whereas the opaque portions thereof prevent scene light from impinging on the film when such blades are in their respective other terminal position. Blade 81, hereinafter called the "opening blade" since actuation thereof initiates the film exposure interval, is in its "light-blocking position" when in its cocked position, and is in its "light-unblocking position" when in its other terminal position, the released position. Conversely, blade 82, hereinafter called the "closing blade" since actuation thereof terminates the exposure interval, is in the "light-unblocking position" when in its cocked position, shown in FIG. 4, and is in its "light-blocking position" when in its release position.

In the same manner as the embodiment shown in FIG. 2, opening blade 81 is retained in its cocked position against the bias of spring 60 when electromagnet 65 is energized. In a similar manner, closing blade 82 is retained in its cocked position when an electromagnet 88 is energized. Both electromagnets are energized and deenergized by the electronic control circuit 200 illustrated in detail in FIG. 5, which circuit includes the aforementioned integrating circuit.

As shown in FIG. 5, circuit 200 includes a normally closed switch S2 which is held open when blade 81 is in its cocked, light-blocking position but is closed in response to initial opening movement of the opening blade. A conventional integrating circuit 202 is connected to switch S2 for integrating with respect to time the signal produced by photocell 32 upon the occurrence of switch S2 being closed. Circuit 202 may, for example, include a resistor and a timing capacitor interconnected to form a conventional RC integrating circuit, the capacitor being coupled to switch S2 to prevent it being charged while the switch is opened. In this manner, once switch S2 is closed whereby an exposure interval is initiated, the timing capacitor commences to charge. Once the capacitor is charged to a predetermined level (which level represents a constant film exposure value) this charge is used to trigger the input of switching circuit 204 ON and to turn its output OFF to thereby deenergize electromagnet 88. When this occurs, closing blade 82 is released to travel to its light-blocking position under the influence of spring 90 to thereby terminate film exposure. It should be noted by those having skill in the art that switching circuit 204 is similar to the aforementioned switching circuits 104, 116 but differs therefrom in that circuit 204 has a reverse functional relationship between its respective input and output stages. That is, switching circuit 204 is of the type having an input stage which is normally non-conducting and an output stage which normally conducts, the input being adapted to conduct when the input signal applied thereto is greater than the aforementioned predetermined level.

In a manner identical to the operation of the embodiment shown in FIG. 2, electromagnet 65 is deenergized when the control signal produced by circuit 109 falls below level Y. When this happens, opening blade 81 immediately begins to travel from right to left under the influence of spring 60 to thereby commence the film exposure interval while at the same time releasing pawl 43 under the control of spring 50 to latch diaphragm mechanism 26. Furthermore, projection 89 integrally connected to opening blade 81 is disengaged from control switch S2, to thereby permit the switch to close, once aperture 81b is aligned with objective 22 so as to begin to expose film F to scene light. With switch S2 closed, the signal produced by photocell 32 is applied through switch S2 to integrating circuit 202 to be integrated thereby. After the aforementioned constant of exposure is reached the input of switching circuit 204 is energized or turned ON and hence the normally energized output stage thereof is turned OFF. When this occurs, coil 88a is deenergized and closing blade 82 is released to terminate the film exposure interval.

The preferred embodiments disclosed herein and shown in FIGS. 2 through 5 can also be used to obtain photographs taken utilizing only ambient illumination. When no flash lamp is used, a constant signal in the place of the signal produced by photocell 102 is applied to terminal 108. This is done by coupling the circuit battery through a variable resistor 118 and a normally closed switch S₃ to terminal 108, switch S₃ being associated with the camera flash lamp receiving socket as is diagrammatically illustrated by arrow A in FIGS. 3 and 5. When a flash lamp is not utilized, switch S₃ is closed and a constant electrical signal related to the resistance value of resistor 118 is applied to terminal 108.

The invention has been described in detail with particular reference to preferred embodiments thereof, but it will be understood that variations and modifications can be effected within the spirit and scope of the invention.

I claim:

1. A method of photographing a scene utilizing artificial illumination, which comprises:
   a. producing artificial illumination of a particular limited duration;
   b. producing, concurrent with the existence of such artificial illumination, a time varying progression of effective exposure apertures through which light, reflected from a scene to be photographed, is to be projected onto photographic film;
   c. establishing, during an initial portion of the flash illumination, a particular effective exposure aperture adequate for producing a given film exposure value during a final portion of such artificial illumination; and
   d. then exposing the film to reflected scene light to produce said given exposure value.

2. A method of photographing a scene utilizing artificial illumination, which comprises:
   a. producing a source of artificial illumination of a particular limited duration;
   b. progressively reducing, concurrent with the existence of such artificial illumination, the magnitude of an effective exposure aperture through which light, reflected from a scene to be photographed, is to be projected onto photographic film;
   c. establishing, during an initial portion of the flash illumination, the smallest effective exposure aperture sufficient for producing during a final portion of such artificial illumination a given film exposure value; and
   d. subsequently exposing the film to reflected scene light to produce said given exposure value.

3. A method of photographing a scene utilizing artificial illumination, which comprises:
   a. progressively reducing an aperture through which light, reflected from a scene to be photographed, is to be projected onto photographic film;
   b. producing a first electrical control signal related to the instantaneous intensity of the artificial illumination;
   c. producing a second electrical signal related to the magnitude of said aperture and the instantaneous intensity of light reflected from a scene being photographed;
   d. forming a control signal equal to the instantaneous ratio of said second electrical signal to said first electrical signal; and
   e. stopping further reduction of said aperture when the magnitude of said control signal is within a predetermined range, then exposing photographic film to the reflected scene light to produce a particular exposure value.

4. A method of photographing a scene utilizing artificial illumination, which comprises:
   a. producing artificial illumination of a particular duration;
   b. producing a time varying progressive of effective exposure apertures through which light, reflected from a scene to be photographed, is to be projected onto photographic film, said aperture variation being commenced in timed relation to initiation of the artificial illumination;
   c. producing an aperture control signal, during an initial portion of the artificial illumination, having a particular parameter related to the ratio of the instantaneous magnitude of the light to be projected onto the film to the instantaneous magnitude of the flash illumination;
   d. stopping further variation of the exposure aperture when said particular parameter is within a predetermined range wherein the smallest effective exposure aperture for producing a given exposure value during the remaining portion of such flash illumination is established; and
   e. then exposing the film to reflected scene light to produce said given exposure value.

5. A method of photographing a scene utilizing artificial illumination, which comprises:
   a. energizing a photographic flash device having a particular output illumination characteristic;
   b. progressively reducing an aperture through which light, reflected from a scene to be photographed, is to be projected onto photographic film, said aperture reduction being conducted in timed relation to said energization of the flash device;
   c. producing an electrical control signal having a particular parameter related to (1) the magnitude of said aperture, (2) the instantaneous intensity of the artificial illumination, and (3) light reflected from a scene to be photographed; and
   d. stopping further reduction of said aperture once said particular parameter is within a predetermined range wherein a maximum depth-of-field is established for the existent light conditions, then exposing the photographic film to ambient and artificial illumination reflected from the scene to produce a predetermined exposure value.

6. A method for controlling an exposure during flash photography comprising the steps of:
   a. energizing a flash device to produce artificial illumination having a particular duration;
   b. illuminating a scene to be photographed with such illumination;
   c. automatically adjusting, during an initial portion of such artificial illumination, an aperture through which light reflected from such a scene is to be projected to produce the smallest aperture with which a particular exposure value can be produced during a final portion of said artificial illumination; and
   d. exposing photographic film to reflected scene light once said smallest aperture is selected to produce said exposure value.

7. A method for controlling a photographic exposure during flash photography comprising the steps of:
   a. energizing a received flash device having a particular output illumination characteristic;
   b. decreasing light reflected from the scene being photographed by progressively reducing an aperture through which such light is to be directed toward a camera film exposure plane;
   c. producing an electrical control signal having a particular parameter functionally related to the instantaneous amount of said reflected light; and
   d. stopping further reduction of said aperture when said particular parameter is within a predetermined range, when opening a shutter, once said aperture is set, for an interval of time to produce a particular film exposure value.

8. A method for controlling exposure during flash photography comprising the steps of:
   a. energizing a flash device to commence a flash picture-taking operation;
   b. attenuating the light reflected from the scene being photographed by progressively reducing the effective aperture through which reflected scene illumination is to be projected onto film from a relatively large aperture size towards a relatively small aperture size;
   c. impinging said attenuated light onto a first photoconductive device while impinging light emitted from the flash device onto a second photoconductive device;
   d. producing an electrical control signal functionally related to the instantaneous ratio of the illumination impinging on said first photoconductive device to the illumination impinging on said second photoconductive device;
   e. stopping further reduction of said aperture when said ratio is within a predetermined range to thereby set an effective lens aperture size; and
   f. opening a shutter, in timed relation to said aperture setting, for a predetermined interval of time related to anticipated flash duration.

9. A method for controlling exposure during flash photography comprising the steps of:
   a. energizing a flash device to commence a flash picture-taking operation;
   b. progressively attenuating light reflected from the scene being photographed by reducing an aperture through which such light to be directed toward a film exposure plane from a relatively large aperture size towards a relatively small aperture size;
   c. impinging said attenuated light onto a first photoconductive device while impinging light emitted from the flash device onto a second photoconductive device;
   d. producing an electrical control signal functionally related to the instantaneous ratio of the illumination impinging on said first photoconductive device to the illumination impinging on said second photoconductive device;
   e. stopping further reduction of said aperture when said ratio is within a predetermined range to thereby set an effective lens aperture size;
   f. opening a shutter in timed relation to said aperture setting;
   g. producing a shutter control signal having a particular parameter related to the cumulative amount of reflected scene light impinging onto a film exposure plane; and
   h. closing said shutter when said particular parameter is equal to a predetermined value.

10. In a camera of the type adapted for receiving a photographic flash device and having means actuatable for energizing such a flash device, the improvement comprising:
    a. means for producing a time varying progression of effective exposure apertures through which light reflected from a scene to be photographed is to be projected onto photographic film;
    b. means actuatable for initiating movement of said exposure aperture producing means in timed relation to energization of a received flash device;
    c. light-sensitive control means operatively associated with said aperture producing means for establishing, during an initial portion of the flash illumination, an effective exposure aperture having a magnitude adequate to produce a given film exposure value during a final portion of such artificial illumination; and
    d. shutter means responsive to said aperture establishing means for exposing the film to reflected scene light to produce said given exposure value.

11. In a camera having means for receiving a photographic flash device of the type adapted to produce artificial illumination of a particular duration, and further including means actuatable for energizing such a flash device, the improvement comprising:
    a. diaphragm means mounted for movement between (1) a tensioned, relatively large aperture defining position and (2) a released, relatively small aperture defining position for defining a varying progressive of effective exposure apertures;
    b. means actuatable for enabling movement of said diaphragm means in timed relation to energization of the flash device;
    c. light-responsive means operable in association with movement of said diaphragm means for producing a control signal having a parameter related to the smallest effective exposure aperture sufficient to produce a given film exposure value during the existence of the artificial illumination;
    d. means responsive to said parameter being within a predetermined range for latching said diaphragm means in a particular aperture determining position indicative of said smallest effective exposure aperture; and
    e. shutter means movable between a light-blocking position and a light-unblocking position and operable in timed relation to latching of said diaphragm means for exposing the film to reflected scene light to produce said given exposure value.

12. A photographic camera having an exposure aperture, a release member actuatable for commencing a picture-taking operation and means for receiving a photographic flash device, the flash device being of the type adapted to produce flash illumination having a particular duration, said camera further including:
 a. shutter means movable relative to said exposure aperture for regulating the passage of light therethrough;
 b. diaphragm means mounted for movement along a path between (1) an initial, maximum apertured position and (2) a final, minimum apertured position for defining a time dependent progressive variation of effective exposure apertures in alignment with said exposure aperture as a function of the position of said diaphragm means along said path;
 c. means responsive to actuation of said release member (1) for effecting movement of said diaphragm means from said initial position toward said final position and (2) for effecting energization of a received flash device to produce the flash illumination in timed relation to initial movement of said diaphragm means;
 d. light-sensitive electrical means having (1) first means for producing a first electrical signal related to light from a scene being photographed and (2) second means for producing a second electrical signal related to the flash illumination, said light-sensitive electrical means further including means coupled to said diaphragm means and responsive to the occurrence of said first electrical signal being related to said second electrical signal by a predetermined factor for arresting said diaphragm means at a particular light-regulating position along said path to thereby establish an effective exposure aperture, said light-sensitive electrical means further including shutter control means coupled to said shutter means and energizable in timed relation to said arresting movement of said diaphragm means for enabling said shutter means to establish a predetermined exposure value.

13. A photographic camera having an exposure aperture, a release member actuatable for commencing a picture-taking operation and means for receiving a photographic flash device, the flash device being of the type adapted to produce flash illumination having a particular duration, said camera further including:
 a. shutter means movable relative to said exposure aperture for regulating the passage of light therethrough;
 b. diaphragm means mounted for movement along a path between (1) an initial, maximum apertured position and (2) a final, minimum apertured position for defining a time dependent progressive variation of effective exposure apertures in alignment with said exposure aperture as a function of the position of said diaphragm means along said path;
 c. means responsive to actuation of said release member (1) for effecting movement of said diaphragm means from said initial position toward said final position and (2) for effecting energization of a received flash device to produce the flash illumination in timed relation to initial movement of said diaphragm means;
 d. light-sensitive electrical means having (1) first means for producing a first electrical signal related to light from a scene being photographed and (2) second means for producing a second electrical signal related to the flash illumination, said light-sensitive electrical means further including means coupled to said diaphragm means and responsive to said first and said second electrical signals for arresting said diaphragm means at a particular light-regulating position along said path during an initial portion of the flash illumination to thereby establish an effective exposure aperture, said light-sensitive electrical means further including shutter control means coupled to said shutter means and responsive to said first and said second electrical signals, said shutter control means being energizable in timed relation to said arresting movement of said diaphragm means for opening said shutter means for a predetermined time interval.

14. A photographic camera having an exposure aperture and further including a release member actuatable for commencing a camera picture-taking sequence, means for receiving a photographic flash device having an output illumination over a particular time interval, and means responsive to actuation of said release member for energizing such a flash device, said camera further comprising:
 a. shutter means for regulating the passage of light through said exposure aperture;
 b. diaphragm means movable between (1) a maximum apertured position and (2) a minimum apertured position for defining a progressive variation of effective exposure apertures;
 c. means mounting said diaphragm means for commencing said progressive variation of effective exposure apertures in timed relation to energization of the flash device;
 d. an electronic circuit having first photoconductive means located to receive light reflected from a scene being photographed and second photoconductive means in optical communication with the flash device to receive flash illumination directly therefrom, said first photoconductive means and said second photoconductive means being interconnected to produce during flash output illumination a control signal for controlling the location of said diaphragm means; and
 e. means coupling said shutter means to said diaphragm means and which in response to initial movement of said shutter means to effect an exposure operates to latch said diaphragm means to establish a particular effective exposure aperture for the shutter open interval.

15. A photographic camera having an exposure aperture and further including a release member actuatable for commencing a camera picture-taking sequence, means for receiving a photographic flash device having an output illumination over a particular time interval, and means responsive to actuation of said release member for energizing such a flash device, said camera further comprising:
 a. shutter means for regulating the passage of light through said exposure aperture;
 b. diaphragm means movable between (1) a maximum apertured position and (2) a minimum apertured position for defining a progressive variation of effective exposure apertures;

c. means mounting said diaphragm means for commencing said progressive variation of effective exposure apertures in timed relation to energization of the flash device;

d. an electronic circuit having (1) first photoconductive means operably associated with first switching means and located to receive light reflected from a scene being photographed and (2) second photoconductive means operably associated with second switching means and in optical communication with the received flash device to receive flash illumination therefrom, said first and second photoconductive means being interconnected to produce during flash illumination a control signal for controlling a flash exposure, said first and said second switching means being interconnected so that said first switching means controls said diaphragm means during an initial period of flash illumination while said second switching means controls said shutter means subsequent to said initial flash illumination period.

16. A photographic camera having an exposure aperture and further including means for receiving a photographic flash device and shutter means movable relative to said exposure aperture to regulate the passage of light therethrough, said camera comprising:

a. a release member actuatable for commencing an exposure cycle;

b. means responsive to actuation of said release member for energizing a received flash device having a particular output illumination characteristic;

c. diaphragm means movable, in response to actuation of said release member, along a path between (1) an initial, maximum apertured position and (2) a final, minimum apertured position for defining a time dependent progressive variation of effective exposure apertures in registry with said exposure aperture as a function of the position of said diaphragm means along said path;

d. first photoconductive means positioned in optical communication with said diaphragm means to receive illumination proportionate to the illumination reflected from a scene being photographed and proportionate to the instantaneous magnitude of said effective exposure aperture, said photoconductive means being adapted to produce a first electrical signal functionally related to the instantaneous level of said received illumination;

e. second photoconductive means arranged and located to receive light produced by the received flash device and adapted to produce a second electrical signal functionally related to the instantaneous intensity of the flash light;

f. means operatively associated with said first photoconductive means and said second photoconductive means for producing an electrical control signal having a particular parameter functionally related to the instantaneous ratio of said first electrical signal to said second electrical signal;

g. switching means having first and second energy states and adapted to be switched from one state to said other state when said particular parameter is within a predetermined range; and h. means actuatable upon the occurrence of said switching means switching from said one state to said other state for (1) securing said diaphragm means in a particular position along said path to thereby establish an effective exposure aperture, and (2) for actuating said shutter means to initiate an exposure interval having a predetermined duration.

17. A photographic camera having an exposure aperture and further including means for receiving a photographic flash device and shutter means movable relative to said exposure aperture to regulate the passage of light therethrough, said camera comprising:

a. a release member actuatable for commencing an exposure cycle;

b. means responsive to actuation of said release member for energizing a received flash device having a particular output illumination characteristic;

c. diaphragm means movable, in response to actuation of said release member, along a path between (1) an initial, maximum apertured position and (2) a final, minimum apertured position for defining a time dependent progressive variation of effective exposure apertures in registry with said exposure aperture as a function of the position of said diaphragm means along said path;

d. first photoconductive means positioned in optical communication with said diaphragm means to receive illumination proportionate to the illumination reflected from a scene being photographed and proportionate to the instantaneous magnitude of said effective exposure aperture, said photoconductive means being adapted to produce a first electrical signal functionally related to the instantaneous level of said received illumination;

e. second photoconductive means arranged and located to receive light produced by the received flash device and adapted to produce a second electrical signal functionally related to the instantaneous intensity of the flash light;

f. means operatively associated with said first photoconductive means and said second photoconductive means for producing an electrical control signal having a particular parameter functionally related to the instantaneous ratio of said first electrical signal to said second electrical signal;

g. first switching means operably associated with said control signal producing means and having first and second energy states, said first switching means being adapted to be switched from one state to said other state when said particular parameter is within a predetermined range;

h. means responsive to said first switching means switching from said one state to said other state for actuating said shutter means to thereby open said shutter means to initiate an exposure interval;

i. means responsive to actuation of said shutter means for securing said diaphragm means in a particular position along said path to thereby establish an effective exposure aperture during said exposure interval;

j. signal integrator means operably associated with said first switching means and adapted to produce a shutter control signal functionally related to the integral of said first electrical signal once said particular parameter of said electrical control signal is within said predetermined range; and k. second switching means coupling said signal integrator means to said shutter means and having first and second energy states, said second switching means being adapted to be switched from said one state to said other state when said integral of said first electrical signal is equal to a particular value, said second switching means including means closing said shutter means upon the occurrence of said particular value whereby a predetermined exposure value is effected.

* * * * *